United States Patent [19]

Tsurukawa et al.

[11] Patent Number: 4,831,399
[45] Date of Patent: May 16, 1989

[54] FINDER SWITCHING APPARATUS FOR CAMERA

[75] Inventors: Ikuya Tsurukawa; Kohichi Nishi, both of Yokohama; Kunihisa Yamaguchi, Ichikawa, all of Japan

[73] Assignee: Ricoh Company, Ltd., Tokyo, Japan

[21] Appl. No.: 136,969

[22] Filed: Dec. 23, 1987

[30] Foreign Application Priority Data

Dec. 23, 1986 [JP] Japan .......................... 61-196770[U]

[51] Int. Cl.$^4$ .......................... G03B 3/00; G03B 13/10
[52] U.S. Cl. .................................. 354/221; 354/199; 354/222
[58] Field of Search ................ 354/195.12, 199, 221, 354/222

[56] References Cited

U.S. PATENT DOCUMENTS

| | | | |
|---|---|---|---|
| 3,665,834 | 5/1972 | Loewe | 354/195.12 |
| 3,836,934 | 9/1974 | Suzuki et al. | 354/195.12 |
| 4,104,663 | 8/1978 | Yamuzaki et al. | 354/195.12 |
| 4,119,983 | 10/1978 | Tanaka | 354/195.12 |
| 4,129,369 | 12/1978 | Kobayashi et al. | 354/195.12 |
| 4,277,158 | 7/1981 | Zawodny | 354/195.12 |

Primary Examiner—A. A. Mathews
Attorney, Agent, or Firm—Oblon, Fisher, Spivak, McClelland & Maier

[57] ABSTRACT

A finder switching apparatus in a two-focus camera in which a finder is switched in conjunction with switching of a lens of the camera between shorter and longer focuses. The finder switching apparatus has a spring mechanism which can amplify a displacement of a parallax correcting lens which is adapted to move in interlocking engagement with the lens barrel so that the mechanism for moving the parallax correcting lens can be small. Accordingly, the two-focus camera having the finder switching apparatus according to the present invention can be made compact, since the space required for storing the finder switching apparatus in the camera is small.

5 Claims, 7 Drawing Sheets

FINDER SWITCHING APPARATUS FOR CAMERA

BACKGROUND OF THE INVENTION

1. Field of the Invention

This invention relates to a finder switching apparatus in a two-focus camera and more particularly to such an apparatus which adjusts a finder optical system for the camera in conjunction with the switching of the lens of the camera between a shorter focus (for example, wide-angle) and a longer focus (for example, telephoto).

Discussion of the Background

There are proposed various forms of a finder switching apparatus of this type in a two-focus camera as follows:

(a) A shorter focus finder and a longer focus finder are selectively formed by guiding a second frame along a cam groove in the camera body to a shorter focus position (to a position for coinciding with the optical axis of the finder optical system) and to a longer focus position (to a position out of the optical axis). In that case, the second frame is driven by a drive lever which drives the lens toward the shorter and longer focus positions.

(b) A second frame is disposed so as to be rotatable around a shaft fixed to the camera body. It is rotated by a drive lever to drive the lens toward the longer and shorter focus positions to thereby form a shorter and a longer focus finders selectively.

(c) A spring is attached at one end to a drive lever which slides a second frame to a shorter and a longer focus sides and at the other end to a stationary portion of the camera body. By driving the drive lever, the second frame is moved to the shorter focus position and to the longer focus position to thereby selectively form shorter and a longer focus finders.

In the finder switching apparatuses in such conventional two-focus cameras, the second frame is directly driven by the drive force of the drive lever which drives the lens toward the shorter and longer focus sides.

Therefore, a finder switching force is added to the lever which drives the lens to the shorter and longer focus sides, so that a load of moving the lens is large, and accordingly it is difficult to handle the lever manually, while if motor driving is employed, a motor having a large capacity is needed disadvantageously and consumes a lot of power.

In all the conventional examples, the movement of the lens barrel corresponds directly to the movement of the mechanism for switching the finder, so that the finder switching mechanism occupies a large space to thereby hinder the realization of a compact camera.

SUMMARY OF THE INVENTION

This invention is derived from consideration of these situations. The object of this invention is to provide a finder switching apparatus in a two-focus camera which has a simple structure, is easily to assemble and adjust, is buildable in a small space, and efficiently uses a drive force for driving the lens to a shorter and longer focus sides to thereby drive a group of finder lenses for forming the optical system of the shorter focus finder between the position where the group of finder lenses coincide with the optical axis of the finder optical system and the other position where the group of finder lenses is out of the optical axis.

This object is achieved by a finder switching apparatus for a two focus camera having a camera body, a lens barrel slidably mounted on said camera body, a finder optical path and a parallax correcting lens group, said camera being adapted to take a long focal distance when said lens barrel is positioned at a first position and to take a short focal distance when said lens barrel is positioned at a second position, said switching apparatus being adapted to locate said parallax correcting lens group at a third position outside said finder optical path to provide a finder view corresponding to said long focal distance when said lens barrel is positioned at said first position and to locate and parallax correcting lens group at a fourth position inside said finder optical path to provide a finder view corresponding to said short focal distance when said lens barrel is positioned at said second position, said switching apparatus comprising:

a first member adapted to be driven by said lens barrel to rotate by a predetermined angle around an axis fixed to said camera body when said lens barrer moves from said first position to said second position, a second member supporting said parallax correcting lens group and adapted to be driven by said first member to move by a predetermined distance in order to move said parallax correcting lens group from said third position to a fifth position between said third position and fourth position when said first member is rotated by said predetermined angle around said axis, and spring means secured at one end thereof to said camera body and secured at the other end thereof to said second member and adapted to move said parallax correcting lens group from said fifth position to said fourth position by a resilient restitutive force thereof after said second member moves by said predetermined distance.

DESCRIPTION OF THE PREFERRED EMBODIMENTS

This invention will become apparent from the following descriptions for preferred embodiments while referring to the accompanying drawings, wherein

FIG. 4 illustrates a standard state (wide angle) of the camera;

FIG. 5 illustrates an intermediate state of the camera via which the telephoto state is changed to the standard state;

FIG. 6(a) illustrates the telephoto state;

FIG. 6(b) illustrates the intermediate switched state;

FIG. 6(c) illustrates a standard state;

Figure 1:
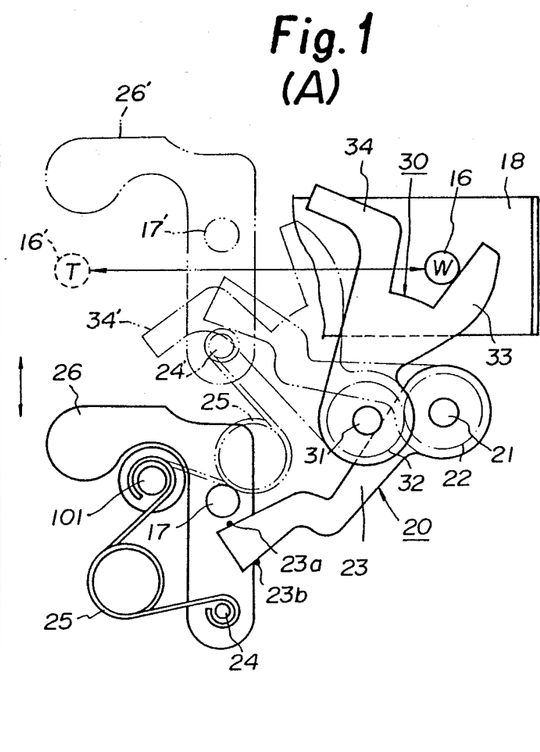
FIG. 1(A) is a plan view showing the essential structure of a first embodiment of this invention.
FIG. 1(B) is a schematic front view of the embodiment illustrating the operation thereof.

A first embodiment of this invention will now be described in detail with reference to FIGS. 1-3.

Figure 2:
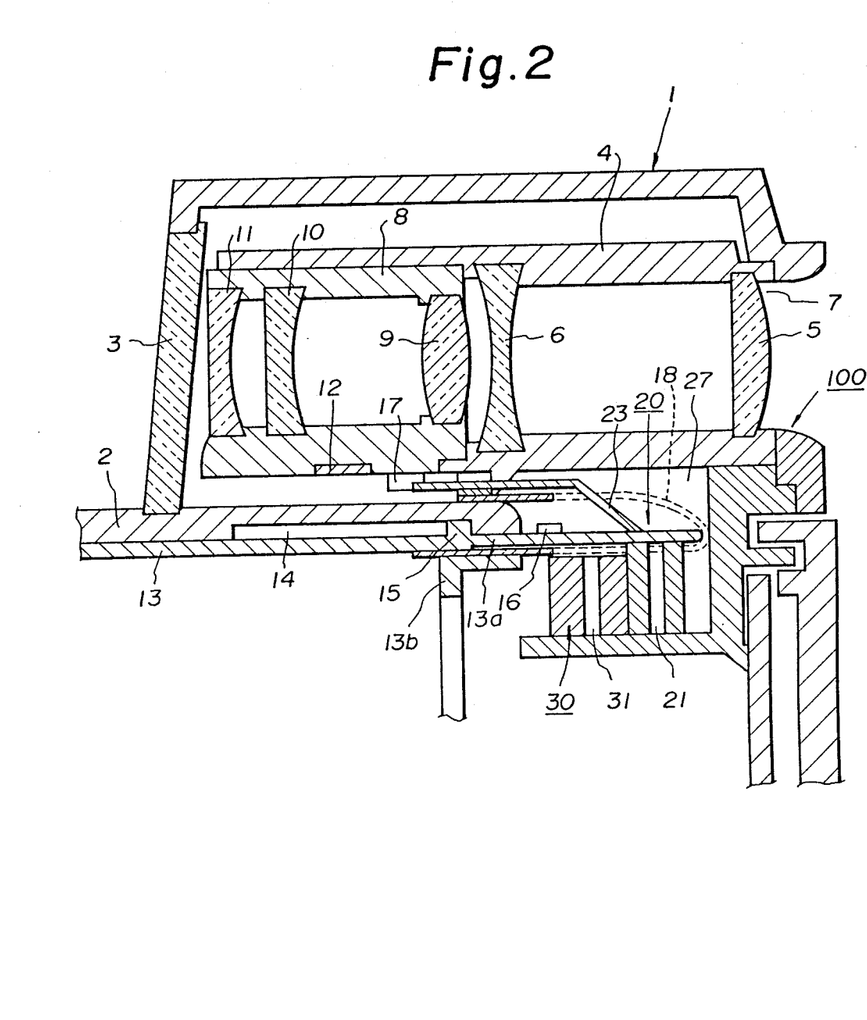
FIG. 2 is a cross-section view of a finder switching apparatus, in a two-focus camera, of the embodiment in which the finder switching apparatus is set at a shorter focus position.
Figure 3:
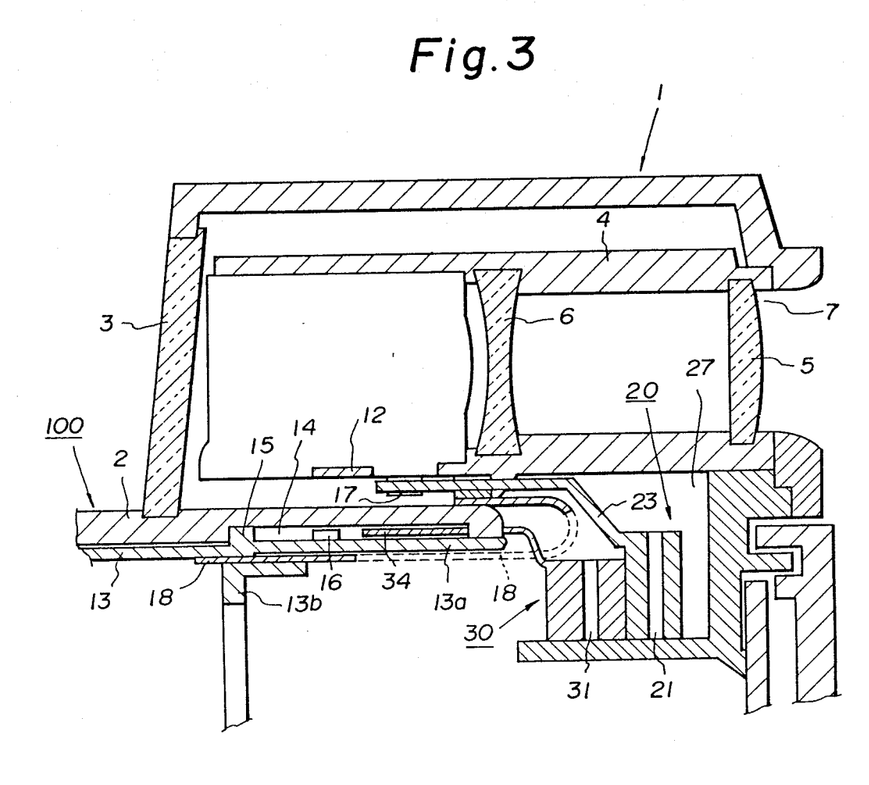
FIG. 3 is a cross-section view of the finder switching apparatus set at a longer focus position.

In FIG. 2, a finder 1 is formed on a camera body 100. A fixed lens barrel 2 is fixed to the camera body so as to form the front end portion of the camera body. A finder front plate 3 is fixed to the front end of the finder 1 in order to protect the front of the finder optical system.

Provided within the finder 1 is a first frame 4 supported fixedly to the camera body 100. Fixed to the first frame 4 is a first group of finder lenses 5 and 6 forming a longer-focus finder optical system.

An eye glass 7 is formed behind the lens 5 while a second frame 8 is disposed in front of the lens 6. The second frame 8 is supported slidable on a strip-like guide 12 extending orthogonal to the optical axis of the finder optical system fixed to the camera body 100 and fixedly supports a second group of finder lenses 9, 10 and 11 (i.e., parallax correcting lens group) forming a shorter-focus finder optical system in conjunction with the first group of finder lenses 5 and 6.

A movable lens barrel 13 is provided slidable within the fixed lens barrel 20 that it is fitted slidable at its rear base 15 into a guide groove 14 formed in the lens barrel 2. The lens barrel 13 is moved backwardly when the shorter focus is intended while it is moved forwardly when the longer focus is intended.

The barrel 13 has a backward extension 13a to which is integrally formed or fixed a drive pin 16 which drives the second frame 8 to the shorter focus position and the longer focus position (removal position) in conjunction with the movements of the lens barrel 13 to the shorter-and-longer-focus sides, respectively. The drive pin 16 is engaged with a lens barrel interlock lever 30, as shown in FIG. 1(A).

Integrally provided on the bottom of the second frame is an L-shaped fixing plate 26 so as to be movable laterally from the camera, namely, vertically in FIGS. 1(A) and (B). The fixing plate 26 has a driven pin 17 as one protruding member which drives the second frame 8 to the shorter and longer focus positions.

A flexible base plate 18 is so supported that one end of the plate 18 is fixed by a shutter base plate 13b fitted fixedly to the lens barrel 13 and the other end of the base plate 18 is fixed between the lower middle portion of the first frame 4 and the upper end of the fixed lens barrel 2. The flexible base plate 18 transmits the shutter time information of a shutter (not shown) attached to the shutter base plate 13b, exposure information, etc., to a display such as a liquid crystal, light emitting diode or the like provided in the finder 1.

A drive arm 20 and a lens barrel interlock lever 30 are so provided on the camera body 100 that they can rotate around supports 21 and 31 and coupled with each other via gears 22 and 32, respectively.

In FIG. 1(A), the drive arm 20 can contact the drive pin 17 at an upper end 23a of its arm 23 and contact a spring anchor 24 as another protruding member fixed to the bottom of the second frame 8 at a lower end 23b of the arm 23. A V-shaped spring 25 having a coil at its middle portion is supported at one end rotatable around the spring anchor 24 and at the other end is rotatable around a spring anchor 101 fixed to the camera body 100.

Therefore, as the arm 23 is rotated clockwise and counterclockwise when the drive arm 20 is rotated by the lens barrel interlock lever 30, the driven pin 17 and the spring anchor 24 are pressed to drive the second frame 8 to the shorter-and longer-focuses sides. By the actuation of the spring 25, the second frame 8 can be driven beyond the ranges corresponding respectively to the shorter and longer focus positions of the arm 23.

The lever 30 which rotates the drive arm 20 has a bifurcation of two branches 33 and 34 of which are spaced by a predetermined distance (in this embodiment, about twice as much as the diameter of the driven pin 16) so that when the drive pin 16 is moved to the shorter-focus side (backwardly from the camera body) as the lens barrel 13 is moved, the lever 30 is turned in one direction in the meantime while, when the drive pin 16 is moved to the longerfocus side (forwardly from the camera body), the drive pin is turned in the other direction in the meantime.

In the particular finder switching appratus, when the lens is positioned on the shorter focus side, the drive pin 16 is moved rightwardly by retraction of the lens barrel 13 as shown in FIGS. 1(A) and (B) and FIG. 2, the branch 33 of the lever 30 is turned to the rightmost end by the drive pin 16.

As a result, the spring anchor 24 is pressed downwardly by the action of the spring 25 and hence the second frame 8 is kept pressed at the predetermined shorter focus position. At this time, the end of the arm 23 is positioned between the driven pin 17 and spring anchor 24.

Therefore, the second frame 8 is positioned forwardly from first frame 4, so that the second and first group of finder lenses, 9, 10, 11, 5, and 6 constitute a predetermined shorter focus finder optical system shown in FIG. 2.

When the lens is positioned on the longer focus side, and the movable lens barrel 13 is extended forwardly by a motor (not shown), the drive pin 16 provided on a member 13a extending from the rear end of the lens barrel 13 also moves leftwardly together with the barrel 13. This causes the other branch 34 of the lever 30 to be pressed by the pin 16, so that the lever 30 is turned counterclockwise around the support 31. This causes the drive arm 20 to rotate around a support 21 clockwise via gears 32 and 22, so that the driven pin 17 is pushed upwardly in FIG. 1(A) by the upper end 23a of the arm 23, and the second frame 8 is guided by the guide 12 to move upwardly.

The branch 33 moves halfway with the drive pin 16. At the end of the movement of the branch 33, the second frame 8 is moved to the predetermined longer-focus position 8' shown by broken lines by the resiliency of the spring 25 even if the arm 23 does not press the driven pin 17.

At this time, the lower end 23b of the arm 23 is pressed by the force exerted by the spring 25 through the spring anchor 24, so that the arm 20 is slightly turned clockwise and the lever 30 is slightly turned clockwise via gears 22 and 32. These motions do not at hinder the movement of the drive pin 16 in this direction.

Therefore, since the second frame 8 is at a position completely out of the front of first frame 4, the first group of the finder lenses 5 and 6 forms the predetermined longer-focus finder optical system.

When the lens is to be moved from the longer focus position to the shorter focus position, the barrel 13 is retracted, so that the drive pin 16 is moved rightwardly from the position 16'. Thus the drive pin 16 presses the branch 33 of the lever 30, so that the lever 30 is turned clockwise and hence the drive arm 20 turned counterclockwise.

This causes the lower end 23b of the arm 23 to press the spring anchor 24 downwardly to thereby move the second frame 8 downwardly from the position 8' shown by broken lines. This movement continues until the second frame 8 passes the balance point of the spring 25, and thereafter the second frame 8 is positioned at the predetermined shorter-focus position by the spring force (expanding force) of the spring 25 to thereby form the shorter-focus finder optical system in a manner similar to that mentioned above.

The finder switching apparatus according to this particular embodiment in a two-focus camera has the following advantages.

First, the drive pin 16 which moves interlockingly with the switching drive member for switching a focal distance has a space between the branches 33 and 34 of lens barrel interlock lever 30, in which the drive pin can move without contacting the branches during predetermined times at the beginning and end of its operation. In the space, no load for changing the finder acts on the pin 16. Therefore, no load for finder switching is added on the drive pin 16 at the beginning of movement of the lens into and out of the axis of its converter lens or at the beginning of extension and retraction of the movable barrel 13 when a large load acts on the pin 16. When the load is alleviated to some extent, a load for finder switching starts to be added, so that the drive efficiency is improved and the drive of the movable barrel 13, etc., ends in a short time.

Second, since the spring 24 is attached at one end to fixing plate 26 integral with the second frame which moves the second group of finder lenses 9–11 between the position coinciding with optical axis and the position out of the finder optical system, so that, in order to move the second frame 8, it is unnecessary to drive the arm 23 through the entire range of movement of the second frame 8 and it is only required to move the arm 23 to such an extent that the spring 25 passes slightly its balance point. Therefore, the rotational angle of the arm 20 and lever 30 may be small and hence the quantity of movement of the extension member 13a and the lens barrel 13 integral with the drive pin 16 may be small. Accordingly, the space occupied by the finder switching mechanism is reduced.

The positioning of the second frame 8 for constituting the shorterefocus finder optical system is performed by the resilient force of the spring 25, so that, advantageously, the force for positioning the lens barrel 13 is not at all influenced adversely.

Third, since the finder switching mechanism constituted by the drive arm 20 and lens barrel interlock lever 30, etc., for finder switching are disposed within the camera body behind the fixed and movable lens barrels 2 and 13, the leakage of light is prevented without using any special leakage preventive means. Especially, the extension member 13a having a function of pushing the flexible base plate 18 can prevent the light entering from a gap between the fixed and movable barrels 2 and 13 thereby eliminating the probability of occurrence of flares, etc., due to the leakage of light.

Fourth, since the finder switching mechanism can be disposed in a dead space below the first frame 4 of the finder 1, the size of the camera is reduced.

Figure 4:
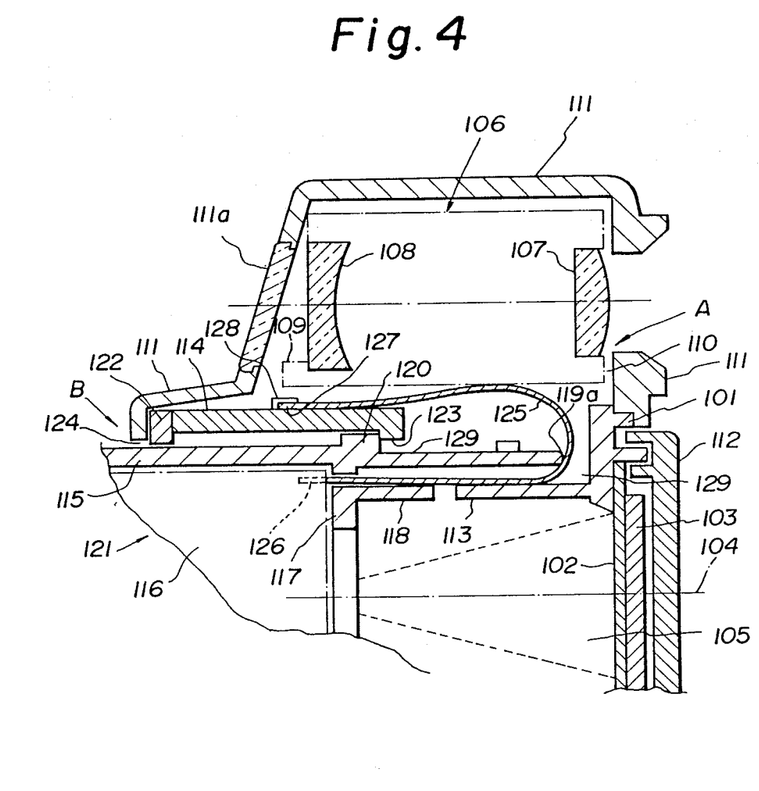
FIGS. 4 and 5 are schematic cross-section views of a structure in which a lens barrel and the camera body are connected in a second embodiment of this invention.
Figure 5:
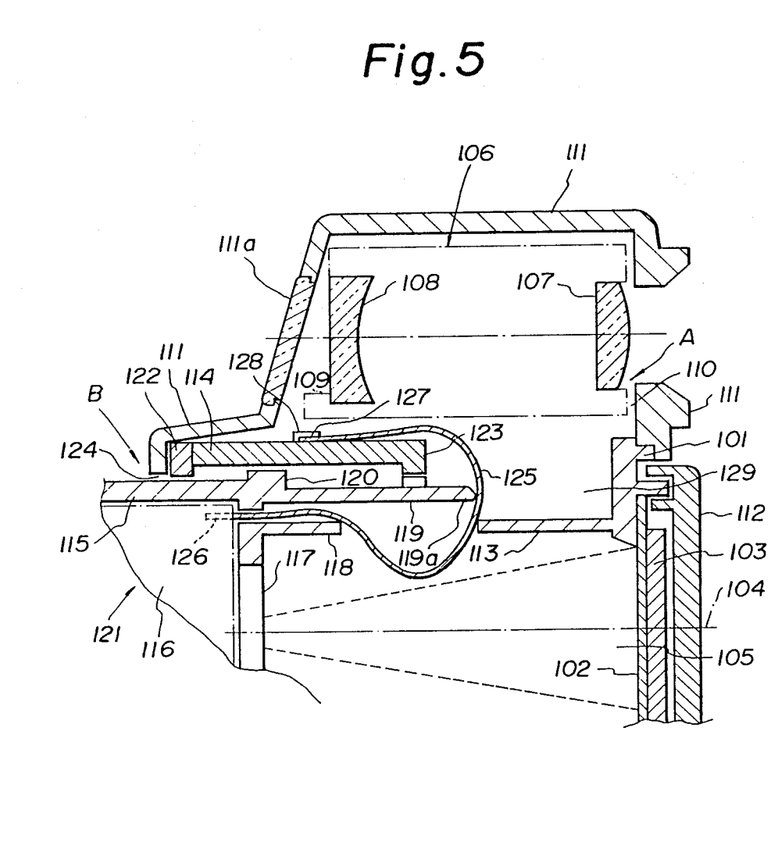
Figure 6A:
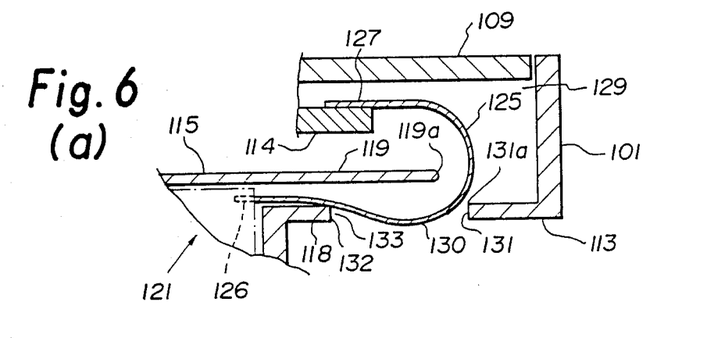
FIGS. 6(a)–(c) are cross-section views schematically illustrating only the essential portions of FIGS. 4 and 5 and also illustrating the operation of this embodiment.
Figure 6B:
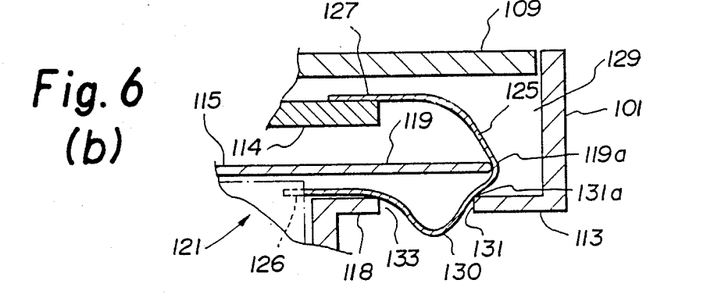
Figure 6C:
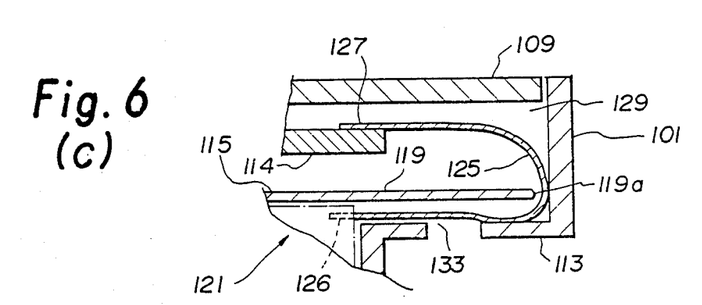

Fifth, since the finder 1 is constructed independent of the camera body, and the shorter- and longer-focus finder optical systms are independent with each other, the finder is easy to adjust. FIGS. 4–6 will now be described compared to a conventional apparatus shown in FIG. 7.

Figures 7A, 7B, 7C:
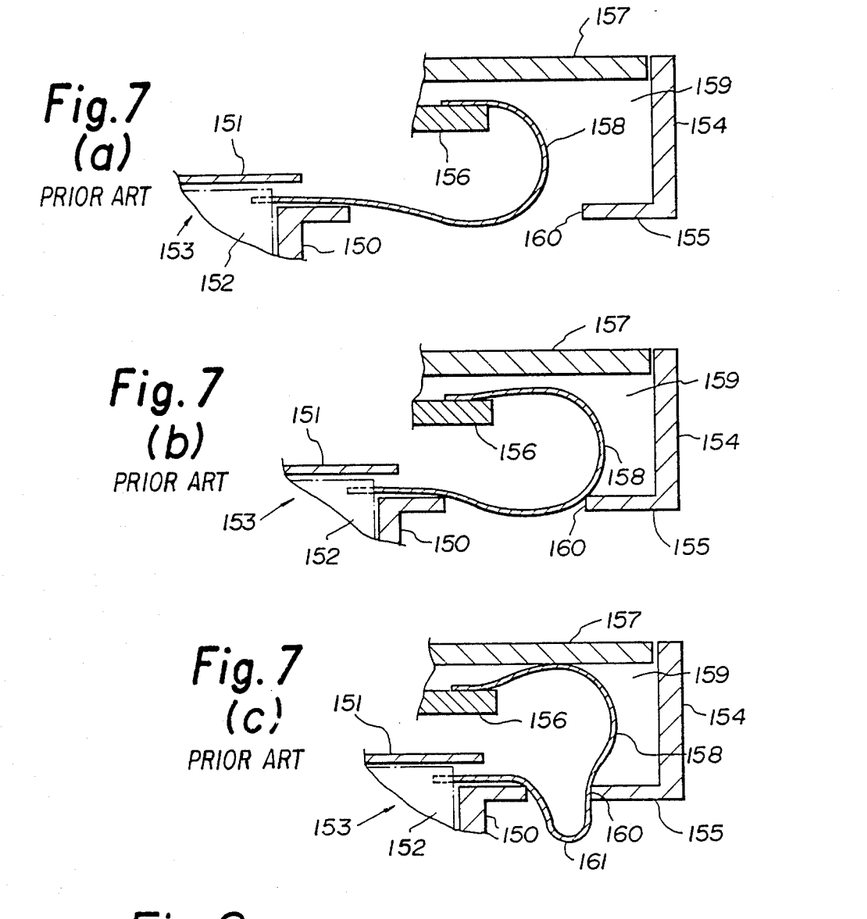
FIGS. 7(a)-(c) are cross-section views of a conventional finder switching apparatus and showing the set states corresponding to FIGS. 6(a)-(c), respectively.

In the conventional finder switching apparatus shown in FIG. 7, an electrically controlled shutter is mounted to a shutter base plate 150, the main lens system, etc., are mounted to movable lens barrel 151. Herein, the shutter, main lens system, etc., are generally referred to the shutter lens unit 152, and the shutter lens unit 152, shutter base plate 150 and movable lens barrel 151 are generally referred to as the movable lens barrel unit 153.

Provided on the camera body 154 are a light shielding plate 155 extending from the camera body, lens barrel 156 fixed to the camera body, finder (reference numeral 157 denotes the bottom of the finder), etc. The movable lens barrel unit 153 and the camera body 154 are connected by a flexible resilient film-like printed board 158 (hereinafter referred to as the FPC) which is fixedly connected at one end to the lens unit 152 and fixed at the other end by the fixed lens barrel 156 and connected to a control circuit unit (not shown) within the camera body 154. The movable lens barrel 151 is slidably fitted into the fixed lens barrel 156. When the movable lens barrel 153 moves along the optical axis (horizontally in FIG. 7), the focus distance of the optical system is changed. FIG. 7(a) shows the telephoto state, FIG. 7(c) shows the standard state (wide angle) and FIG. 7(b) shows the state changing from FIG. 7(a) to FIG. 7(c).

FPC 58 used herein has the merits of mechanical durability and simplified wire connection, but has no elasticity itself. Thus FPC 58 must have an excess of length equal to at least the distance which the movable lens barrel 153 moves. If FPC 58 has such an excess of length, it is necessary to provide a space or chamber 159 in the camera body 154 in which the excess of length of FPC 58 is accommodated.

Figure 8:
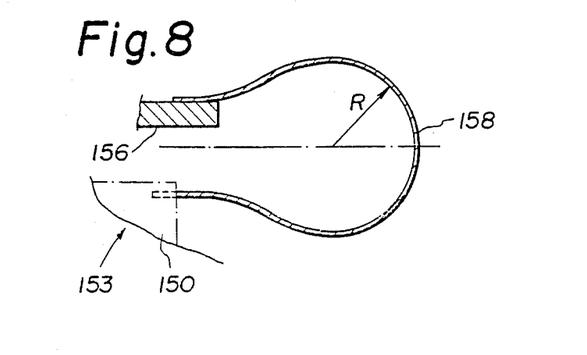
FIG. 8 is a cross-section view showing the deformation of a flexible printed board (FPC), both ends of which are fixed.

As shown in FIG. 8, when FPC 158 is in a free state in which FPC 158 is fixed only at both ends, it is freely deformed to have a large radius R of curvature due to its resiliency to thereby occupy a large space, so that the chamber 159 is also required for limiting the space for the carvature. However, if FPC 158 is bent beyond the radius limit of curvature, it may be broken, therefore, the accommodating chamber 159 cannot be so small. In addition, as shown in FIG. 7(b), when the movable lens barrel 153 is retracted into the camera body 154, FPC 158 may be hooked on an end 160 of the light shielding plate 155. In this case, as shown in FIG. 7(c), the movable lens barrel 153 is required to be further retracted against the resiliency of FPC 158, so that a large force therefor is required to thereby apply an excessive load on the drive system (not shown) of the movable lens barrel 153. In addition, if the movable lens barrel 153 is further retracted under the situation in FIG. 7, FPC 158 may be broken at its suspended portion 161 and not be recovered to its original form to thereby create a disconnection in the electric circuits.

In order to change the focal distance of the optical system, as described above, it is necessary to move the movable lens barrel 153 greatly relative to the camera body 154 and move the secondary lens system into and out of the optical axis between the movable lens barrel 153 and the inner rear end of the camera body 154. Furthermore, it is required to change the focal distance of the finder unit. Namely, since there are many members movable relative to the camera body 154, stray light may enter through the movable members into the camera body (the dark box 105), so that there are various troublesome problems of shielding such light.

Since the secondary lens system must be put out of the optical axis at the standard photographing state (wide angle), the space for accommodating the secondary lens system is required inside the camera body. Therefore, there is a requirement for reducing the space for accommodating FPC as much as possible in order to render the camera compact, which contradicts with the requirement for preventing a breakage in the FPC.

In the finder switching apparatus of the second embodiment of this invention shown in FIGS. 4 and 5, reference numeral 101 denotes camera body; 102, a film charged in the camera body; 103, a film pressure plate which presses the film 102 at its back; 104, the optical axis of the optical system; 105, the inside of the dark box enclosed by the camera body 101, a back cover to be described later and the shutter base plate; 106, a finder disposed in a part (the upper portion in this embodiment) of the camera body 101 around the optical axis 104; 107–109, members constituting the finder 106 wherein 107, an eye lens, 108, an objective lens; 109, a lens fixing frame which fixes and supports the lenses 107 and 108; 110, a gap between the finder 106 and camera body 101; and A, stray light entering through the gap 110. Reference numeral 111 denotes a finder cover covering the finder 106; 111a, a protective galss plate fitted into a part of the finder cover; and 112, a back cover hinged at one side of the camera body 1 and locked at the other side of the camera body 1. Reference numeral 113 denotes a light shielding plate extending forwardly from the rear end of the inside 105 of the dark box along the optical axis 104 in order to shield stray light A entering through the gap 110 into the camera body (into the inside of the dark box); 114, lens barrel fixed to the camera body 101 and having a central axis aligned with the optical axis 104; 105, movable lens barrel fitted into the fixed lens barrel 114 and slidable only in the direction of the optical axis; a shutter lens unit (hereinafter referred to as the LSU) fixed to the movable lens barrel 115 which comprises an electrically controlled shutter and a group of lenses constituting the main lens system; 117, a shutter base plate integral with SLU 116; 118, a support plate protruding toward the light shielding plate 113 from the shutter base plate 117; 119, a press plate extending from the movable lens barrel 115 toward the light shielding plate 113 along the optical axis 104; 120, an engaging protrusion provided at the front end of the movable lens barrel 115; 121, a movable lens barrel unit comprising the movable lens barrel 115—engaging protrusion 120; 122 and 123, engaging protrusions provided at the front end and rear edge of the fixed lens barrel 114; 124, a gap between the engaging protrusion 122 of the fixed lens barrel 114 and the movable lens barrel 115; B, stay light entering through the gap 124; 125, a flexible film-like printed board (hereinafter referred to as the FPC) having resiliency and flexibility; 126, a fixing portion of FPC 125 on the side of the movable lens barrel 121; 127, a fixing portion of FPC 125 on the side of the camera body; 128, a member which fixes FPC 125 to the portion 127; and 129, a chamber for accommodating FPC 125 formed with the inner end 106a (in this embodiment, the bottom) of the finder 106 and the upper surface of the light shielding plate 113.

FIGS. 6(a)–(c) are cross-section views illustrating the embodiment and showing only the essential portion of FIGS. 4 and 5 slightly schematically. FIG. 4(a) shows the telephoto state; FIG. 6(b), the transitive state; and FIG. 6(c), the standard (wide angle) state.

In FIGS. 6(a)–(c), reference numeral 130 denotes a suspended portion of FPC 125; 131, an end surface of light plate 113; 131a, a corner of the end surface; 132, and an support plate 118; and 133, an opening formed between the end 132 and the end surface 131 of light shielding plate 113. Identical reference numerals are used to identify identical members in FIGS. 4, 5 and 6, and overlapping description will be omitted.

The operation of this embodiment will now be described.

First, shielding stray light A and B will be described. The entrance of stray light A and B into the dark box inside 105 is prevented by light shielding plate 113 and press plate 119. Especially, in the transitive state (FIG. 5), the entrance of stray light A and B into the dark box inside 105 is prevented, since the opening 133 formed between the support plate 118 and light shielding plate 113 is covered by press plate 119. Therefore, a flare which occurs due to entrance of stray light A and B into the dark box inside 105 is prevented.

The prevention of a breakage in FPC 125 will now be described. FPC 125 is suspended by its own weight as shown in FIG. 6(a) depending on the thickness and flexibility of FPC 125 to form a suspended portion 130. In the telephoto state, the movable lens barrel 121 is extended most forwardly, so that the opening 133 is maximum in its size and a suspended portion 130 is likely to be generated. When, for example, a switching button is pressed to change the lens from the telephoto state to the standard state, the movable lens barrel 121 is driven by the motor to be retracted gradually into the camera body 101. In that case, in FIGS. 6(a)–(c), the movable lens barrel 121 moves from the left-hand side to the right-hand side. In response to this movement, the FPC 125 changes from the state of FIG. 6(a) through the state of FIG. 6(b) to the state of FIG. 6(c) or FIG. 4. In FIG. 6(b), FPC 125 is in contact with the corner 131a of the end surface 131 and hooked by the corner due to a frictional force produced therebetween, so that as the movable lens barrel 121 moves, the radius of curvature of the suspended portion 130 is reduced. At the same time, the leading end portion 119a of the press plate 119 forming a circular arc surface thereof abuts the inside of U-shaped FPC 125 and presses the U-shaped portion in the opposite direction (rightward in FIG. 6), so that the suspended portion 130 is lifted into the accommodating chamber 129. Therefore, the problems explained with reference to FIG. 7(c), namely, breakage in FPC 125, will not occur and, finally, the FPC is accommodated smoothly inside the accommodating chamber 129, as shown in FIG. 6(c). Therefore, an excessive force (or load) does not act on the motor and the movement of the movable member 121 is performed smoothly.

As described above, in this embodiment, provision of the accommodating chamber 129 prevents the expansion of FPC 125 which would occur in the conventional example (FIG. 8) and reduces the accommodating space for FPC 125. The provision of press plate 119 serves to prevent occurrence of a flare due to stray light, also to prevent a breakage in FPC 125 and to bring about smooth movement of the movable lens barrel 121.

As described above in the detail, according to this invention, a finder switching apparatus for a two-focus camera is provided, which has high drive efficiency for changing a finder, which positions a second frame for forming a shorter-focus finder optical system at a shorter-focus position coinciding with the optical axis without influencing the drive force for positioning the movable lens barrel, which is free from leakage of light, and which contributes to the compactness of the camera.

This invention is not at all limited to the above embodiments. Various changes and modifications could be made without departing from the gist of this invention.

We claim:

1. A finder switching apparatus for a two focus camera having a camera body, a lens barrel slidably mounted on said camera body, a finder optical path and a parallax correcting lens group, said camera being adapted to take a long focal distance when said lens barrel is positioned at a first position and to take a short focal distance when said lens barrel is positioned at a second position, said switching apparatus being adapted to locate said parallax correcting lens group at a third position outside said finder optical path to provide a finder view corresponding to said long focal distance when said lens barrel is positioned at said first position and to locate said parallax correcting lens group at a fourth position inside said finder optical path to provide a finder view corresponding to said short focal distance when said lens barrel is positioned at said second position, said switching apparatus comprising:

a first member adapted to be driven by said lens barrel to rotate by a predetermined angle around an axis fixed to said camera body when said lens barrer moves from said first position to said second position, a second member supporting said parallax correcting lens group and adapted to be driven by said first member to move by a predetermined distance in order to move said parallax correcting lens group from said third position to a fifth position between said third position and fourth position when said first member is rotated by said predetermined angle around said axis, and spring means secured at one end thereof to said camera body and secured at the other end thereof to said second member and adapted to move said parallax correcting lens group from said fifth position to said fourth position by a resilient restitutive force thereof after said second member moves by said predetermined distance.

2. An apparatus according to claim 1, in which said first member is adapted to be driven by said lens barrel to rotate reversely by said predetermined angle around said axis when said lens barrel moves from said second position to said first position, said second member is adapted to be driven by said first member to move reversely by said predetermined distance in order to move said parallax correcting lens group from said fourth position to said fifth position when said first member is rotated reversely by said predetermined angle around said axis, and said spring means is adapted to move said parallax correcting lens group from said fifth position to said third position by said resilient restitutive force after said predetermined distance.

3. An apparatus according to claim 1, in which said spring means comprises a V-shaped spring.

4. An apparatus according to claim 1, in which said finder view corresponding to said long focal distance is provided by a finder lens group fixedly located in said finder optical path.

5. An apparatus according to claim 1, in which said parallax correcting lens group comprises three lenses.

* * * * *